April 27, 1965 R. E. FUTER 3,180,688
AIR-LIFT CONVEYING OF SOLIDS
Filed May 22, 1963
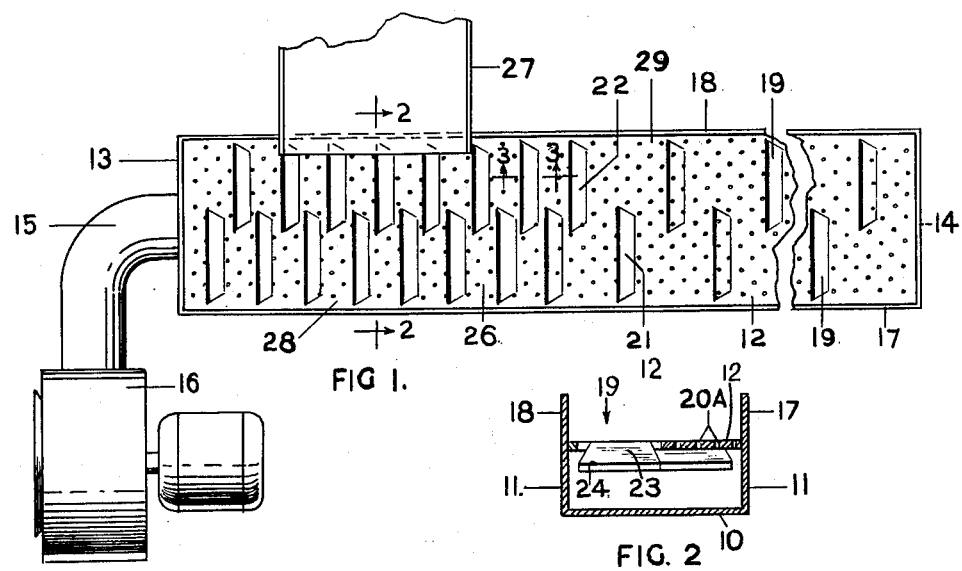
FIG 1.
FIG. 2
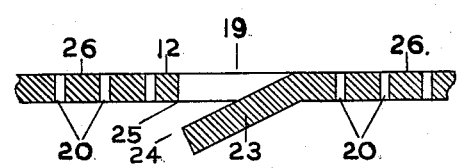
FIG 3.
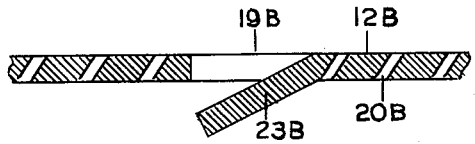
FIG 6.
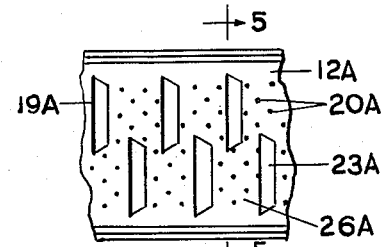
FIG. 4.
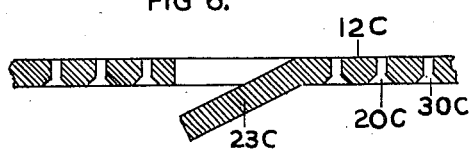
FIG 7.
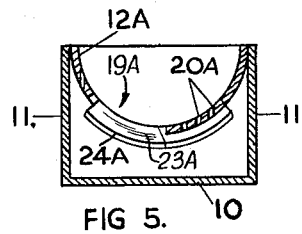
FIG 5.
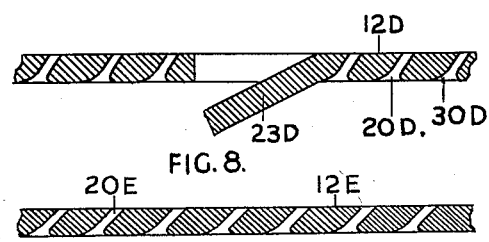
FIG. 8.
FIG. 9.

United States Patent Office 3,180,688
Patented Apr. 27, 1965

3,180,688
AIR-LIFT CONVEYING OF SOLIDS
Rudolph E. Futer, Piedmont, Calif.
(1401 Eastshore Highway, Berkeley 10, Calif.)
Filed May 22, 1963, Ser. No. 282,486
12 Claims. (Cl. 302—29)

The invention relates to the conveying of solid objects over a membrane by air-jets emitted through said membrane, the said jets exerting a lifting and a propulsion force on the said solids. Examples of such objects are card and corrugated box blanks, packages, lumber, paper and cardboard scraps, and boxes.

More particularly, the invention is concerned with the use of air-jets for moving such solid objects, wherein the conveying system does not include moving parts, such as belts and moving floors.

The use of air-jets emitted from slits formed in air-tables or membranes for propelling objects is known from my U.S. Patent No. 3,131,974, issued May 5, 1964. In such applications upwardly and down-stream inclined air-jets are projected through a membrane to impart both lifting and propulsion forces to said objects. While such systems are eminently suitable for moving light objects as well as those which can be moved at high speed without damage, it was found that it is often difficult to adjust the relation of the lifting and the propulsion forces which act on the objects. Especially when objects of high density, such as boxes, are moved a considerable air-blast is required to create enough lift to overcome friction against the membrane and cause downstream movement; such a strong blast consumes a large quantity of air, which must be supplied by a compressor, and/or propels the objects with excessive velocity once the frictional drag is overcome. The balancing of the horizontal propulsion force and the lifting force is difficult to control.

It is the object of this invention to provide an improved membrane wherein the lifting and propulsion forces are applied separately and can be more easily brought into the desired ratio or balance than in the known construction, especially when objects having a high density are to be transported.

A further object is to provide an improved air-jet conveying system wherein the solid objects to be moved over a membrane are lifted by special air-jets which act principally, or exclusively, to exert an upward force on said objects, and other air-jets are provided especially designed to exert a propulsion force on the objects to cause movement downstream, although exerting some lifting force.

Another object is to provide an improved membrane and air-jet conveying system which applies different horizontal forces on the objects in the downstream direction in different zones, whereby objects can be accelerated in the downstream direction at a feed or entry zone of the system (to which they may be introduced with substantially no inertial component in the downstream direction), and be subjected in subsequent zones to lesser downstream forces, just sufficient to maintain their momentum despite drag.

According to a preferred though optional construction, the improved membrane has air-passages extending therethrough which are shaped at their inlet ends with convergent sections to reduce pressure losses in the air at the entrance and thereby produce a more efficient air-jet action.

In summary, the membrane according to one feature of the invention, adapted to form the top wall of a plenum chamber to which air is supplied under pressure, is formed with two groups of passages extending therethrough for the upward flow of air: (1) a set of propulsion passages which are strongly inclined to the membrane surface to direct propulsion air-jets which have principal flow components parallel to the membrane surface in the downstream direction, and (2) a set of lifting passages which provide air-jets imparting principally upward or lifting forces to the objects, although the latter may impart some propulsion force.

By this arrangement it is possible to exert lifting forces on the objects sufficient to reduce frictional drag against the membrane, so that smaller propulsion forces need be applied to the objects. The propulsion forces can thereby be more readily controlled to attain the downstream velocities of the objects as desired, making possible more moderate or controlled downstream velocities of the objects with consequent reduced damage thereto. Further, the quantity of air required to move the objects over the membrane can often be reduced. This is a considerable advantage over the uncontrolled, high-speed movement of the objects which usually results from the use of but a single set of air passages through the membrane for performing both the propulsion and the lifting functions.

An additional advantage of this construction is that the design of the membrane is simplified. For example, it is possible to select the number and/or sizes of the lifting passages independently of the propulsion passages, at least with a greater degree of freedom, in accordance with the nature of the objects to be transported. When objects having a high weight in relation to their horizontal areas are transported, a greater upward force to reduce frictional drag is more easily applied by increasing the number and/or the sizes of the lifting passages in relation to the propulsion passages.

According to an optional feature of the invention, the propulsion passages are situated at closer longitudinal intervals in certain parts, e.g., at the feed zones, than at other parts. This provides at the said feed zone, to which the said objects may be charged with little or no longitudinal downstream velocity, a region of high force in the downstream direction, and the objects are therein accelerated to the desired speed; downstream from said zone the horizontal forces need be only sufficient to overcome drag and may be made less intense. This is facilitated by the use of separate lifting and propulsion passages.

The action of the air-jets on the solid objects is determined, in part, by the velocity with which the air emerges from the passages. It was found that the same velocity can be attained without loss of propelling effect and with a reduced pressure in the air within the plenum chamber by flaring the lower ends of the passages. This provides a convergent section to the passages and results in a more efficient conversion of pressure to kinetic energy. This feature may be aplied both to the vertical and to inclined lifting passages.

The conveyor system includes a plenum chamber to which air ("air" being used in this specification generically to include other gaseous media) is supplied under pressure and which is bounded at the top by the membrane previously described, through which the air flows in part through the propulsion passages and in part through the lifting passages. The membrane may be flat or trough-shaped, i.e., its transverse section may be upwardly concave. It is preferably provided at its margins with low side walls for confining the solid objects and is preferably vented, i.e., open upwardly to the atmosphere substantially throughout its full length. Thereby the air does not create a high-pressure zone above the membrane and objects can be placed onto the membrane at any point along its length. In this respect the conveyor system according to the invention differs from certain known conveyor systems wherein a closed duct is used and the air is confined to flow along the membrane or conveyor floor through an upwardly closed-in channel after emerging from the membrane.

According to the preferred, although optional, arrangement, the propulsion passages are slits which extend transversely to the longitudinal downstream direction and have lengths (in the said transverse direction) several times the widths of the slits, and the lifting passages are situated in the intervening portions of the membrane between consecutive slits. The lifting passages are, for example, multitudinous and individually much smaller in cross sectional area than the said slits. For example, they may be formed as pin-sized apertures. The lifting passages may extend vertically or have forward inclinations.

According to another preferred, although optional, feature, the slits which constitute the propulsion passages are arranged in several longitudinal rows and the slits in each row are staggered longitudinally with respect to the slits of the adjacent rows, whereby the intervening membrane portions which contain the lifting passages are situated laterally with respect to the slits of the adjacent row(s). By thus providing a multitude of small lifting passages or apertures between adjacent slits of the same row and alongside of the slits of the adjacent row, a lifting action on the objects being conveyed can be exerted more uniformly throughout the membrane area. Frictional drag is thereby reduced more effectively and the said objects are less subject to being suddenly jerked into motion by the propulsion jets or by impact from following objects.

The membrane is advantageously formed with propulsion slits which are formed by depressing the membrane at the downstream side of each of a plurality of slits in the membrane (which incisions may be formed simultaneously with the depressing operation). The depressed edges do not overlap the upstream edges longitudinally. The advantages of this construction are an increase in the propulsion efficiency (as appears from the data in the experimental example presented in the cited U.S. patent specification) and reduced tendency for the slits to become clogged by adventitious solid matter carried by the air, which is apt to be encountered in most industrial atmospheres. In this arrangement the downstream edge of each slit is situated below the upstream edge without overlap and the membrane part which forms the upstream portion of each slit slopes upwards from said downstream edge to the aforesaid intervening membrane portion which preferably has a length exceeding that of the inclined membrane part.

The upper membrane surface is free from obstructions which would prevent the free movement of the solid objects over it. In the preferred construction the said intervening portions, be they flat or upwardly concave, lie in common longitudinal, parallel lines which extend in the longitudinal direction and are the highest parts of the membrane.

It may be noted that the downwardly flaring shapes of the apertures through the membrane are useful even when no slits are provided; the axes of the small apertures are then given a suitable inclination to provide both propelling and lifting forces.

The invention will be further described with reference to the accompanying drawings showing certain illustrative embodiments and forming a part of this specification, wherein:

FIGURE 1 is a plan view of a conveyor using the membrane according to the invention;

FIGURE 2 is a transverse sectional view taken on the line 2—2 of FIGURE 1;

FIGURE 3 is an enlarged fragmentary longitudinal sectional view taken on the line 3—3 of FIGURE 1;

FIGURE 4 is a fragmentary plan of a conveyor according to a modified construction;

FIGURE 5 is a transverse sectional view taken on the line 5—5 of FIGURE 4;

FIGURE 6 is a sectional view corresponding to FIGURE 3 showing a modified construction of the lifting passages in the membrane;

FIGURE 7 is a sectional view corresponding to FIGURE 3 showing a further modification of the membrane;

FIGURE 8 is a sectional view corresponding to FIGURE 3 showing another modification of the membrane, and FIGURE 9 is a longitudinal view of a membrane, also corresponding to FIGURE 3, wherein no slits are used.

Referring to FIGURES 1–3, the conveyor includes an elongated plenum chamber having a bottom wall 10 and side walls 11 and closed at the top by a rigid membrane 12, which is constructed in accordance with the invention. The chamber includes end walls 13 and 14, the former having an opening to which is connected an air-supply duct 15 leading from an air-blower 16. The membrane 12 is open to the atmosphere throughout its area for the placement of objects thereon for transport and for the upward escape of air which flows through the membrane passages to be described. Low side walls 17 and 18 extend upwards from the membrane margins, for confining objects being transported. The wall 18 is breached to receive a feed chute 27 inclined downwardly to the membrane for feeding solid objects thereto.

The membrane 12 may be constructed of sheet metal, e.g., $\frac{1}{16}$ to $\frac{3}{16}$ inch in thickness, and has some rigidity. It is formed with two groups of passages, which include propulsion passages or slits 19 and lifting passages 20. The slits 19 are arranged in a plurality of longitudinal rows 21, 22, and the slits in each row are staggered longitudinally with respect to those of the other, as shown. The slits have lengths, extending transversely to the downstream direction, which are several times as great as their widths, "widths" denoting the vertical gap between the downstream edges 24 of the slits to the upstream edges 25. The slits are preferably formed by incising the membrane and depressing the downstream membrane portions 23 at each incision relatively to the upstream portions, whereby the said depressed portions 23 are inclined upwards in the downstream direction (toward the wall 14). The downstream edges 24 of the resulting slits are, therefore, situated below the upstream edges 25 without longitudinal overlap. Typically, the vertical gap between these edges is from $\frac{1}{64}$ to $\frac{1}{8}$ inch. Between each inclined membrane portion 23 and the next slit edge 25 is an intervening membrane portion 26 which is flat. The several flat portions 26 have their upper surfaces situated in a common plane, which is the highest part of the membrane.

Lifting apertures 20 are formed in the membrane portions 26. In this embodiment they are formed as a multitude of small, substantially vertical apertures, circular in cross section. They may, for example, be drilled or punched pin-holes, viz., from $\frac{1}{64}$ to $\frac{1}{8}$ inch in diameter.

The numbers and sizes of the lifting passages 20 can be varied in accordance with the nature of the objects to be transported. Also, the longitudinal intervals between consecutive slits 19 in each row can be varied, in accordance with the forward velocity desired for the objects and, further, in accordance with the lifting force exerted by the air-jets which issue from the passages 20, which influence drag. By separately controlling these variables, i.e., the sizes and numbers as well as the inclinations of the propulsion passages 19 and the lifting passages 20, it is possible to accommodate the conveyor membrane to handle any of a variety of objects having different weights in relation to their bottom horizontal areas, as well as different frictional characteristics.

It should be noted that the upper surface of the membrane 12 is unobstructed and is defined by the intervening portions 26, whereby the solid objects can move readily. These intervening portions may be polished to present smooth, low-friction surfaces. The membrane may be mounted substantially horizontally, as shown, or may be inclined upwardly or downwardly in the downstream direction. The relation between the lifting forces and the propulsion forces can be readily adjusted for such inclination, by using apertures of different numbers and/or sizes in membrane sections having different longitudinal inclinations.

Another instance in which control of the relation between propulsion and lifting forces is useful is found when solid objects are fed laterally onto the membrane. Thus, as appears in FIGURE 1, objects supplied to the membrane from the chute 27 have no velocity component in the longitudinal downstream direction of the membrane. To accelerate these objects initially, the propulsion slits 19 in the zone 28 opposite the chute 27, are spaced apart at lesser longitudinal intervals than in the zone 29, which is situated downstream therefrom. The decreased spacing causes an increased horizontal propulsion force on the objects within the zone 28 to accelerate them, and a lesser propulsion force in the downstream zone 29. It is evident that this variation in the interval between propulsion passages may be applied also when changes in grade occur.

By way of a specific example, the membrane 12 may be a sheet of steel $\frac{3}{64}$ inch thick and 12 inches wide, and the slits 19 may be formed two inches apart, with the edges 24 situated $\frac{1}{16}$ inch below the edges 25. Each flat membrane portion 26 contains thirty apertures 20, each having a diameter of $\frac{1}{32}$ to $\frac{1}{8}$ inch.

In operation, air is admitted from the blower 16 via the duct 15 to the plenum chamber and flows upwards through the propulsion slits 19 and the lifting apertures 20. Objects, such as boxes, placed on the membrane, are subjected to upward forces by the air-jets which emanate from the lifting passages 20, whereby the frictional drag of the objects against the membrane is materially reduced. The propulsion air-jets which emanate from the slits 19 have strong horizontal flow components in the downstream direction and propel the objects downstream. The latter air-jets additionally exert upward forces on the objects. The result is that the objects are moved in the downstream direction, either at a moderate or high speed, in accordance with the relation of the groups of passages and the air pressure within the plenum chamber. The forces are substantially uniform along the parts of the membrane of like construction and inclination, due to the upward venting of the membrane.

Referring to FIGURES 4 and 5, there is shown an embodiment in which the membrane 12A is trough-shaped in cross section, being upwardly concave. This membrane forms the top of a plenum chamber 10 having side walls 11 and provided with air-supply means as previously described. The membrane is formed with a series of longitudinally spaced slits 19A by depressing edges 24A at the downstream sides of transverse incisions below the upstream edges 25A, to form inclined membrane portions 23A, all as previously described with reference to the first embodiment, parts without letter suffixes being in correspondence. The membrane portions 26A are cylindrical in shape, i.e., the upper parts of these membrane portions lie in common, straight, parallel longitudinal lines, which are the highest parts of the membrane. These portions 26A have vertical lifting apertures 20A to produce lifting air-jets.

The embodiment of FIGURES 4 and 5 operates as described for the first embodiment. However, the side walls 17 and 18 are usually omitted. This embodiment is especially suited for conveying elongated objects, particularly those having rounded cross sections, such as sticks and tubes.

In FIGURE 6 the membrane 12B has propulsion passages 19B, formed by depressing membrane portions 23B as previously described. The lifting passages 20B are, however, inclined upwardly in the downstream direction, to exert a force on the propelled objects in the downstream direction. This downstream force is smaller than the lifting force.

FIGURE 7 shows a modification in which the membrane 12C, formed with a depressed portion 23C as previously described, has its lifting passages 20C flared in the downward direction, to provide convergent entrance sections 30C. As shown, the flared sections may be formed by drilling from the bottom to form frusto-conical passage walls. These approximate the more correct shapes shown in FIGURES 8 and 9. The convergent entrance sections 30C lower the entrance coefficient of the passage in the formula which expresses the flow of air in terms of pressure. Thereby the pressure within the plenum chamber required to attain a given mass flow of air from the lifting passages is reduced, and the power which must be applied to the blower 16 is reduced.

FIGURE 8 shows another modified construction of the membrane 12D, which is formed with a series of depressed portions 23D as previously described. The membrane has inclined lifting passages 20D, which tend upwards in the downstream direction. These passages are formed with downwardly flared portions 30D, which correspond to the sections 30C but are shaped in the manner of a calyx, with curved walls instead of being frusto-conical. Such rounded entrance sections are somewhat more efficient than those of FIGURE 7, although more costly to form. The air-jets formed by the passages 20D of FIGURE 8 provide minor flow-components in the downstream direction to assist in propelling the objects along the membrane.

FIGURE 9 shows a membrane 12E, constructed with lifting and propulsion passages 20E formed as described for the passages 20D of FIGURE 8. However, the propulsion apertures are omitted, and the passages 20E provide both the lifting and propulsion forces on the objects.

I claim:

1. A rigid membrane for an air-conveyor wherein solid objects are moved by air-jets, said membrane having an unobstructed upper surface for the movement thereover of said objects in a longitudinal downstream direction and being formed with two groups of air-passages extending therethrough for the upward flow of air to the upper surface thereof, said groups including:
    (a) a multitude of propulsion passages situated at longitudinally spaced positions and inclined relatively to said upper surface to direct propulsion air-jets having predominantly horizontal flow components along said surface and oriented to impel said objects in said downstream direction, and
    (b) a multitude of lifting passages distributed longitudinally among said propulsion passages and disposed to direct lifting air-jets having flow components predominantly perpendicular to said surface to impart a lifting force to said objects, there being a plurality of lifting passages situated at longitudinally spaced locations between each pair of longitudinally adjacent propulsion passages.

2. A membrane as defined in claim 1 wherein the upper surface of said membrane lies in common, parallel, straight longitudinal lines, said lines being the highest parts of the upper membrane surface.

3. A membrane as defined in claim 2 wherein said upper surface lies in a common, flat plane.

4. A membrane as defined in claim 1 wherein said propulsion passages are slits formed in the membrane, said slits having lengths extending transversely to said longitudinal direction for distances several times the widths of the slits, at least some of said lifting passages being situated within the intervening membrane portions which lie between longitudinally adjacent propulsion slits.

5. A membrane as defined in claim 4 wherein each lifting passage situated between said propulsion slits, has a cross sectional area which is much smaller than that of the said slits.

6. A membrane as defined in claim 4 wherein said propulsion slits are arranged in a plurality of longitudinal rows, the slits in adjacent rows being longitudinally staggered, whereby the intervening membrane portions which contain the lifting passages in each row are situated laterally with respect to the slits of an adjacent row.

7. A membrane as defined in claim 1 wherein said propulsion passages are spaced apart in the longitudinal direction at closer intervals in one part of the membrane than at another part thereof, thereby providing in the first-mentioned part an acceleration zone for imparting to said objects a greater horizontal propulsion component than in the latter part.

8. In combination with the membrane as defined in claim 1,
 (a) a plenum chamber which is bounded at the top by the said membrane and includes enclosing walls,
 (b) side walls extending upwards from the lateral margins of said membrane for confining said objects, and
 (c) means for supplying air under pressure to said chamber for upward flow through said propulsion and lifting passages,
 (d) said membrane being upwardly open to the atmosphere throughout substantially the full length thereof.

9. A membrane as defined in claim 1 wherein said lifting passages are small, substantially vertical apertures extending through the membrane.

10. A membrane as defined in claim 1 wherein said lifting passages are flared outwardly at the lower ends thereof to provide convergent entrance sections.

11. A membrane as defined in claim 1 wherein said lifting passages are small apertures extending through the membrane having their central axes inclined to direct said lifting air-jets with minor components in said downstream direction.

12. An air-lift conveyor for moving solid objects by air-jets which comprises:
 (a) a plenum chamber bounded at the top by a rigid membrane and including confining walls,
 (b) said membrane extending longitudinally in a downstream direction and being formed with a series of transverse slits which are spaced longitudinally to provide intervening membrane portions, said slits being inclined with respect to the upper membrane surface upwards in the said downstream direction,
 (c) said membrane being further formed with a plurality of lifting apertures extending therethrough and having axes which extend predominantly perpendicularly to said upper surface, said lifting apertures having cross sectional areas that are small in relation to those of the slits and there being a plurality of lifting apertures situated at longitudinally spaced locations between each pair of longitudinally adjacent slits, and
 (d) means for supplying air under pressure to said plenum chamber for flow of a part thereof through said propulsion slits and another part thereof through said lifting apertures to exert upward and downstream forces on said objects for propelling the latter over said membrane.

References Cited by the Examiner
UNITED STATES PATENTS

| | | | |
|---|---|---|---|
| 1,515,965 | 11/24 | Pardee | 302—31 |
| 1,731,779 | 10/29 | Houston | 302—29 |
| 1,971,853 | 8/34 | Ihlefeldt | 302—31 |
| 2,174,716 | 10/39 | Bethell | 302—29 |
| 2,666,269 | 1/54 | Parry | 302—29 |
| 2,805,898 | 9/57 | Willis | 302—29 |
| 2,848,820 | 8/58 | Wallin | 302—29 |

SAMUEL F. COLEMAN, *Primary Examiner.*
ANDRES H. NIELSEN, *Examiner.*